United States Patent [19]

Meeres

[11] 3,950,955
[45] Apr. 20, 1976

[54] UNDERWATER PIPELAYING SYSTEM
[75] Inventor: Richard Donald Meeres, Leduc, Canada
[73] Assignee: Banister Continental Ltd., Mississauga, Canada
[22] Filed: Feb. 20, 1974
[21] Appl. No.: 444,252

[52] U.S. Cl. .................................................. 61/72.3
[51] Int. Cl.² ................................................ F16L 1/00
[58] Field of Search ............. 61/72.3, 72.1; 214/1 P

[56] References Cited
UNITED STATES PATENTS

| | | | |
|---|---|---|---|
| 2,910,835 | 11/1959 | Timothy | 61/72.3 |
| 3,559,413 | 2/1968 | Silverman | 61/72.3 |
| 3,641,779 | 2/1972 | Koop, Jr. et al. | 61/72.3 |
| 3,822,558 | 7/1974 | Blankenship | 61/72.3 |

Primary Examiner—Jacob Shapiro

[57] ABSTRACT

The invention relates to a system for laying underwater pipelines in Arctic regions from an ice surface. The present invention comprises an underwater pipe laying guideway; and an above-ice supporting means, including means to adjustably support the guideway through a channel cut in the ice at a series of points and varying depths beneath the ice surface. The adjustable supporting means, which preferably supports the guideway in a pendulous fashion, causes the guideway to conform to a predetermined shape capable of supporting the pipe without undue stress therein. Means is also provided to pick up the pipe and feed it into the guideway. The configuration of the guideway is monitored and means is provided for moving the system along the ice.

16 Claims, 7 Drawing Figures

3,950,955

UNDERWATER PIPELAYING SYSTEM

BACKGROUND OF THE INVENTION

The present invention relates to a system for laying an underwater pipe line from an ice surface.

With the growing demand for oil and gas, it is becoming necessary to tap reserves in some of the more remote and environmentally inhospitable parts of the world. Considerable effort is being devoted to the task of tapping Arctic deposits and bringing the oil or gas to market by means of pipe lines. Certain proposals, for example exploiting oil and gas deposits in the Canadian High Arctic, necessitate the crossing of large stretches of water between islands. In addition, oil and gas reserves may also be located in off shore regions of the Arctic coast which will in turn necessitate underwater gathering pipeline systems to bring the petroleum reserves to central production facilities.

In high Arctic regions ice formation begins in the early fall, generally continues to build in thickness until approximately mid May and then begins to reduce in thickness until break up occurs in the early summer. The magnitude of ice thickness is extreme with average depth of ice being around 6 to 8 feet. Pressure ridges and rafting also occur so that the ice surface will be anything but smooth and may attain intermittent thickness of approximately 15 feet.

While the ice surface may appear to be substantial it is in effect a giant plastic medium which is subject to limits of loading from the surface and also responds to the tide effects that occur in the High Arctic regions. In addition to the limitations of the strengths of the ice the severity of the High Arctic climate will be a major factor in construction. In the high Arctic Island systems, winter temperatures of −70° F. are not uncommon and wind velocities in excess of 70 m.p.h. may also occur at the same time.

The utilization of high capacity pipelines, that is large diameter pipelines, appears to be one of the most satisfactory means of transporting the vast reserves of oil and gas from the High Arctic to the marketing areas.

Additional research into the inter island passages through which a pipeline system may be constructed have recently revealed that channel depths of 800 to 1,200 feet and in some cases beyond that may be expected. To date in the North Sea, which is considered to be a very hostile area, pipe has been laid to depths of only 450 feet by conventional marine lay barges.

Clearly inter island pipelines and potential off-shore pipeline gathering systems to be constructed in the High Arctic Islands will be made under the most awesome conditions of extreme sub-zero temperatures and extreme high wind velocities, the combination of which may make visibility almost zero.

Historically, the most common method of installing marine pipelines has been by the lay barge method. In this method, relatively short pipe lengths are joined together on the barge, the barge is then moved forward and the assembled pipe is paid out at the stern of the lay barge and subsequently laid on the ocean floor. As the pipe exits from the barge it follows a somewhat S-shaped configuration from the barge deck to the ocean floor. This S-shaped configuration may be generally divided into two regions, the overbend region and the sag bend region. The overbend region by definition is that portion of the said S-shaped configuration located immmediately behind the stern of the barge and follows a rearwardly and downwardly convex pattern that will terminate at the point of counterflexure. The sag bend region is by definition that portion of the said S-shaped configuration from the point of counterflexure rearwardly and downwardly in a concave manner to the relative touchdown position of the pipe on the bottom contour. The point of counterflexure is generally described as that position where the overbend region and the sag bend region join together.

Stresses imposed on the pipe in the overbend region are normally controlled by means of an elongated stinger connected to the barge, over which the pipe passes. As the pipeline is paid out from the stern of the barge into the stinger, which may be buoyant, the stinger supports the pipeline for substantial depth below the lay barge and thereby controls its curvature. From the point of departure from the stinger, the pipeline enters into the sag bend region and continue in this sag bend or catenary-like configuration to its touchdown position on the ocean floor. In order to control stresses in the unsupported portion of the pipeline, it is necessary to apply tension to the pipe continuously during the laying operation. This is normally accomplished by means of tensioners located on the deck portion of the lay barge.

In relatively shallow waters, the vertical descent of the pipeline being small, enables the development of large radii of curvatures for the pipeline as it comes off the lay barge into the overbend region and also permits a gradual curvature in the sag bend region as well. However, as the water depths increase, it is readily observable that the length of the unsupported pipeline also increases and this increasing length causes the pipeline to sag under its own weight. As a result, the combined stresses imposed on the pipeline in the sag bend region may exceed the allowable limits of the pipe material and result in permanent deformation of the pipeline. As can be fully appreciated a pipeline is capable of withstanding some bending but any bending of the assembled pipe, combined with other stresses acting on the pipe during installation, must not cause the pipe to be permanently deformed, buckled or ruptured so as to render the installed pipeline inoperative. Even under the modest depths achieved to date, over stressing of the pipe where the pipe departs from the stinger or in the sag bend region, have occcured. While the traditional lay barge techniques has had limited success under North Sea conditions, to date this same technique has never been tested at the extreme subzero temperature nor at the extreme water depths, that will be experienced in the High Arctic regions.

Looking to contemplated Arctic channel crossings the first inclination is to attempt to extrapolate and modify conventional lay barge techniques to apply. However, many of the Arctic channel crossings are not free of ice cover or massive ice flows for a period long enough to allow a lay barge to navigate to the proposed crossing sites, let alone complete installation of a given crossing before the barge would become ice bound. In addition, the prospect of extending conventional lay barge techniques, to water depths in the order of 800 to 1200 feet is far from certain.

Previous mention has been made of the Arctic currents; one of the interesting considerations of Arctic currents is that they are in existence on a year around basis irrespective of whether the Arctic waters are ice covered or not. In addition, the currents have a tendency to be reversible over a short period of time.

Under normal lay barge techniques, when a pipeline is laid in a channel where currents are prevalent, the barge can be manoeuvered in a yaw position so that as the pipe departs from the stern of the lay barge and from the terminal point of the submerged position of the stinger, the pipe in effect departs tangentially. This assures that the pipe is not over stressed in a lateral or horizontal direction due to the actions of the current on the pipe.

The present invention seeks to overcome the difficulties of operating upon water in Arctic conditions by utilizing the ice surface as the working surface. however it is not practical to adapt conventional lay barge techniques to an ice surface type operation. In order to facilitate a lay barge type technique on an ice surface it would be necessary to tow a barge-like sled across the ice laying the pipe through a slot or channel cut in the ice. Such a concept poses major problems. The weight of such an ice lay barge and the load that it would have to carry to support the pipe during the laying operation would probably cause the ice to fail. Of equal concern, unlike the floating lay barge, the stinger on which the overbend portion of the pipe is supported must pass through a relatively narrow slot or channel cut in the ice. Provided a slot of sufficient width could be excavated, the orientation of the stinger might be adjusted to avoid the aforementioned over stressing of the pipe at the point of departure from the stinger due to the lateral deflections caused by the current acting on the pipe. However in order to accomodate this orientation, an extremely wide ditch or channel would have to be cut into the extremely deep ice so that the orientated stinger would not become entangled with the bottom contour of the ice thickness itself. Even under these unlikely conditions, a further complication occurs, that of the lateral displacement of the pipe. Because the barge-like sled would be located on the top of the ice with the stinger projecting through the slot in the ice, it would be impossible to maneouver the barge to compensate for the large deflections due to the current and at the same time maintain the stinger in the channel.

Without this surface manoeuvering, the laying of the pipe along a required predetermined laying path, would be virtually impossible. The pipe in effect would have a zig-zag configuration in its final resting place on the bottom due to the effects of the reversing currents. The magnitude of these alignment deviations may be in the order of several hundred feet with the consequent danger of over stressing the pipe to the point of failure.

Obviously the standard technique of water borne lay barge methods for laying Arctic pipeline is impractical due to the predominance of the heavy ice. It is equally apparent that the utilization of a sled-like lay barge, operating from the surface of the ice, has serious deficiencies.

It has been proposed earlier to lay an underwater pipeline from an ice surface, by means of a barge-like device which was towed across the ice surface and carried a downwardly and rearwardly extending guideway, or stinger like element, which was heated in such a fashion that it cut a channel through the ice when the barge was pulled across the ice. The pipe was lowered to the bottom of the water down the stinger through the slot in the ice which it created.

The fact that water depths along some of the more favourable of proposed pipe line routes exceed 800 feet and at times approach 1,200 feet, together with the very thick ice encountered, makes this proposal impractical for high Arctic use. Clearly it would be unrealistic to melt a channel in very thick ice and equally unrealistic to attempt to lay pipe in regions where any cross currents were encountered. Furthermore, the simple stinger like arrangement of the prior proposal would be adequately support the pipe line for laying in great depths.

SUMMARY OF THE INVENTION

According to the present invention a system for the underwater laying of pipe located on an ice surface through a channel cut in the ice, comprises an underwater pipe laying guideway; an above-ice supporting means, including means to adjustably support the guideway through said channel at a series of points and varying depths beneath the ice surface, to cause said guideway to conform to a predetermined shape capable of supporting the pipe and including means to pick up the pipe and feed it into the guideway means to monitor the configuration of the guideway means; and means for moving the system along the ice.

According to a preferred feature of the invention the guideway is pendulously supported by the support means.

In a preferred construction the above ice supporting means includes a train of travelling gantries, each gantry spanning the ice channel and at least certain of them adjustably cable-supporting a section of the pipelaying guideway; and at least the leading gantries of the support means having means to pick up the pipe and assist the feeding thereof into the guideway.

According to a feature of the invention, means may be provided for applying a tensile force to the pipe in the direction of train travel.

The guideway may extend from the ice surface substantially to the bottom of the water, or, it may in accordance with another feature of the invention, where tensile force is applied to the pipe in the direction of train travel, terminate well short of the water bottom.

According to a further feature of the invention the means for moving the train along the ice includes interconnections between the individual gantries comprising, on one side of the channel, a series of draw bars and, on the other side a winch operated cable means adapted to adjust the angular position of the gantries relative to each other on the ice surface.

BRIEF DESCRIPTION OF DRAWINGS

The following is a description by way of example of certain preferred embodiments of the present invention reference being had to the accompanying drawings in which.

DESCRIPTION OF PREFERRED EMBODIMENT

Figure 1:
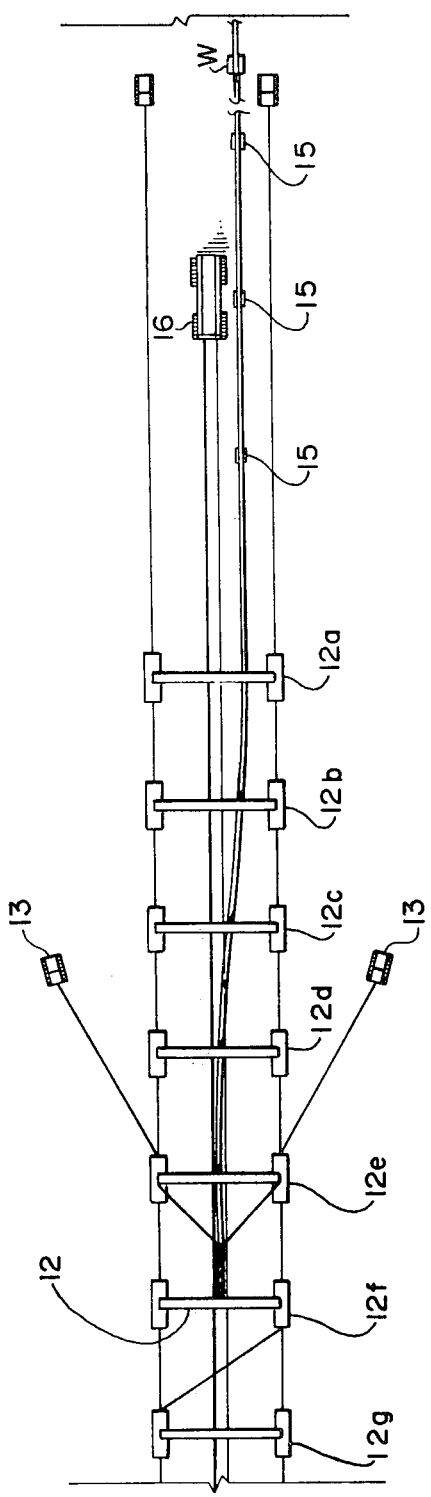
FIG. 1 is a schematic view of a train, in accordance with the present invention, moving along an ice surface.

Because of the extreme conditions encountered in Arctic regions it is desirable that as much as possible of the tasks necessary to lay the pipe be conducted in shelter and thus the line 10, to be laid under water, is preferably prefabricated in a sheltered area in long lengths, say of thousands of feet. The pipe lengths are moved to a prepared right-of-way on the ice along which a channel 14 is to be, or has been cut. There the pipe rests on rollers 15 awaiting laying.

A system for laying the underwater pipe line 10 includes a train 11 of travelling gantires 12 which are mounted on trailers, sleighs, or the like, and are towed by means of tractors 13, or other suitable means, in the direction of the channel 14 cut in the ice by a suitable channel digging device 16. The trailers, sleighs, etc. may, for safety, be provided with a floatation capability.

Figure 6:
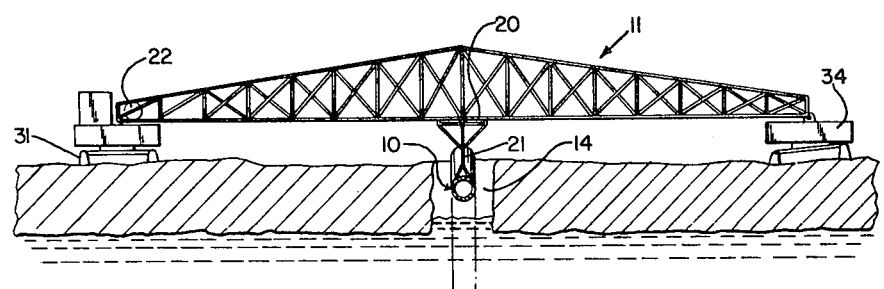
FIG. 6 is a detail of the gantry looking along the direction of pipe laying; and, FIG. 7 is a detail plan view of the terminal portion of the train showing the connections between the gantries.

The gantries (see particularly FIG. 6) span the ice channel and are provided with a travelling block 20 over which a cable 21 passes. The cable 21 is wound on a winch drum 22. The cables on the leading gantries 12a, 12b, 12c, 12d, 12e carry standard pipe rollers for picking up the pipe from the rollers 15 and delivering it to a guideway 25.

Figure 4:
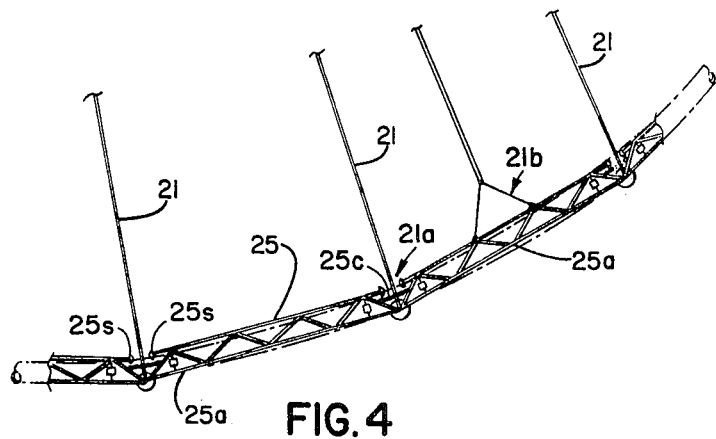
FIG. 4 is a detail of the guideway in side elevation.
Figure 5:
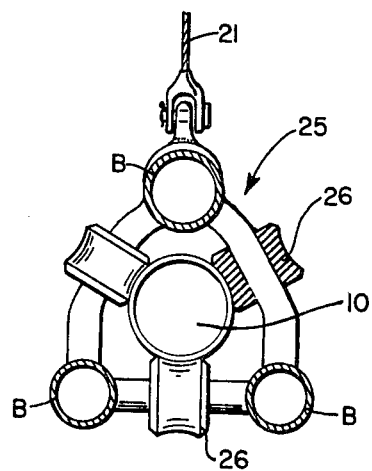
FIG. 5 is a detail of the guideway looking along the pipe in the direction of laying.

The guideway 25 which may be made up of a series of individual sections 25a connected together for pivotal motion in the vertical plane is pendulously supported on cables 21 from the remaining gantries 12f, 13g, etc. of the train. Two alternative forms of the slinging are shown at 21a and 21b in FIG. 4. The cables themselves may be marked, or other means may be provided to measure the length of cable which has been paid out to determine the depth below the surface of individual guideway sections. The guideway 25 may be of general triangular configuration, as best seen in FIG. 5, and carries rollers 26 through which the pipe passes. The guideway sections 25a are provided with bend limiting stops 25s and reverse bend limiting cables 25c. The sections 25a may be provided with bouyancy chambers B which can be flooded to provide a variable bouyancy effect.

Tractors 13, in the embodiment shown, form part of a means for moving the train 11 along the ice and are cable connected to certain of the gantries. The gantries are themselves individually connected as part of the means for moving the train along the ice by means of draw bars 30 connecting support means, say, sleighs 31 on one side of the ice channel 14 and by cable means 33 on the other side of the channel. The cable means 33 are anchored at 33a to the rear of sleighs 34, pass over pulleys 35 on the sleighs 31. The draw bars 30 are preferably connected with the sleighs 31 so that there is lost motion between draw bar and sleigh and any angular slewing of an individual gantry relative to the train is controlled by means of the winches 38.

Figure 7:
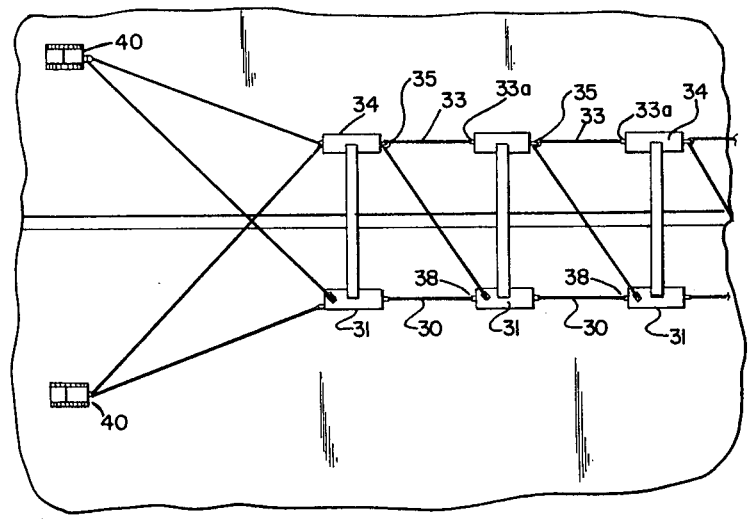

Tension is maintained on the whole train when required, by means of trailing tractors 40 (see FIG. 7) which act as brake cars.

As has been mentioned earlier the ice adjacent the channel edges can be subjected to only limited loads and the gantry configuration, by spanning the channel, not only splits the load but also enables its distribution over a much wider area than is possible with conventional methods. As will be seen from FIG. 6, the sleighs 34, 31 are mounted to the span of the gantry crane in such a fashion that they can absorb variations in terrain level.

It will be understood, of course, that the gantries could be self propellled on, say, wheels or endless tracks.

In operation, soundings of the ocean bed beneath the channel are taken so that there is a complete knowledge of the ocean bottom available to the operators, ahead of the train movement. The train 11 is brought into position and proceeds along the right-of-way with the leading gantries 12a–12e lifting the pipe and noving it from its resting place by means of the travelling blocks 21, incrementally over, feeding it into the guideway 25. The rollers 15 act as part of the above-ice supporting means for the pipe by providing part of the means to feed the pipe into the guideway 25. Friction between rollers 15 and pipe tends to brake the pipe as it is fed into the guideway 25. The means to feed the pipe preferably also includes a winch W which regulates the pipe length to compensate for the variations in the length of suspended pipe as the depth varies, such as when departing from, or approaching, the shore line.

Figure 2:
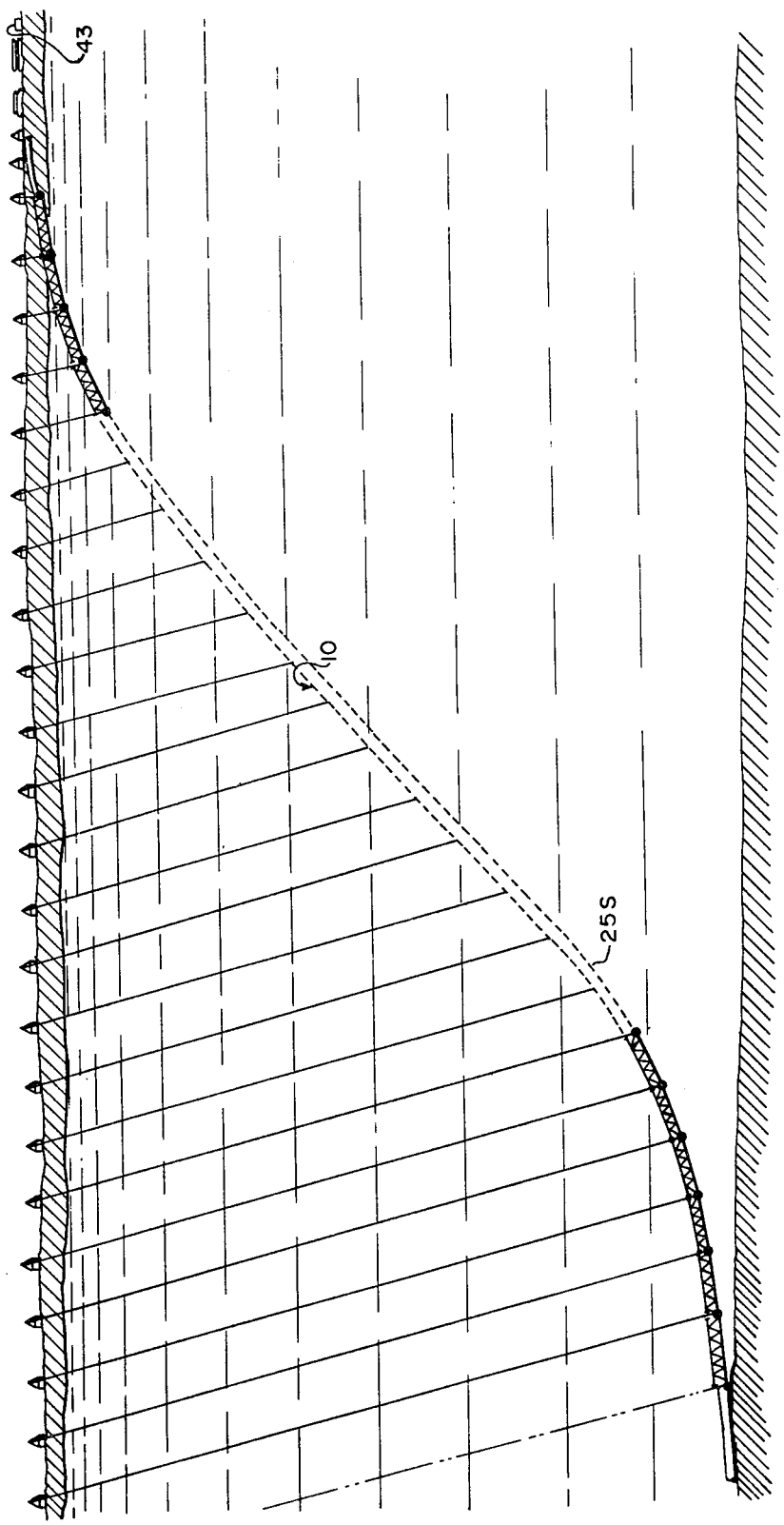
FIG. 2 is a schematic side elevation of the same device showing one configuration in which the guideway extends to the water bottom.

The guideway 25 may extend from the ice surface right down to the ocean bed (see 25s FIG. 2) in such a fashion that the pipe 10 is guided from the surface under complete support right down to the ocean bed, without at any time unduly stressing the pipe by bending it into configurations beyond its design limit. In order to accomplish this, each of the cables 21 from each of the gantries, hasto have its length computed, taking into account the distance from the ice surface to the ocean bed and allowing for variations in that bed.

The operators can determine, from the physical characteristics of pipe, the limit of the configuration which the guideway has to adopt in order to avoid overstressing of the pipe. Since the length of the train and guideway is known and the configuration of the ocean floor is known, the length of each cable, in order to permit the required pipe laying configuration of the guideway can be calculated. The winches 22 adjust the lengths of the cables to cause the guideway 25 to take up the required shape. The marking on the cables (or other means) serve as a monitor of the configuration of the guideway. Because of the many variables involved, it may be preferable to enlist a computer to aid in the computation of the varying lengths of cable and to automatically control the individual winch drums 22.

The pipe may be subjected to a tensile force by means of a tensioning anchor device, diagramatically shown at 43, which can be anchored to a point on shore, or, the ice surface. This tensile force in the pipe would act as a safety feature if one or more of the individual cables 21 failed. The tensioning anchor means may also act as part of the means to feed the pipe into the guideway when it is used to compensate the pipe length adjustment as required for varying bottom contours, such as when departing or approaching the shore, as mentioned hereinbefore.

Figure 3:
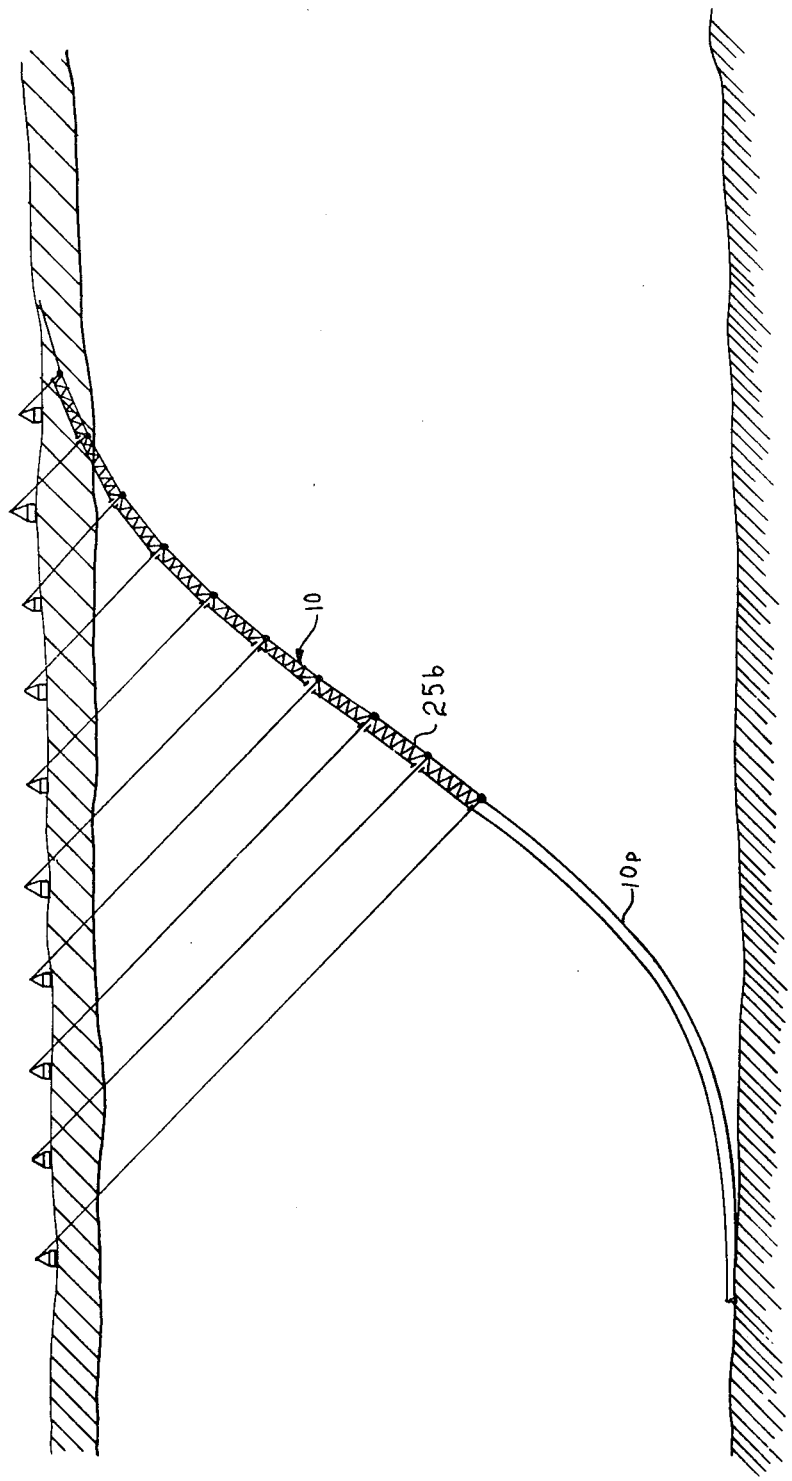
FIG. 3 is a view similar to FIG. 2 in which the guideway terminates short of the water bottom.

In a second method of operation (see FIG. 3) the guideway 25b extends only part way to the ocean bottom and the pipe section 10p thereafter acts as a structural member. In this instance the guideway 25 obtains a different configuration and in this method it is essential to apply tensile force to the pipe 10.

If the pipe and guideway 25 encounters cross currents during laying, the tendency for the pipe and guideway to shift beneath the ice surface away from the channel is counteracted by the fact that the pipe and guideway act on the cables much in the fashion of a pendulum. This is to say, the cable supported pipe and guideway produce a restoring couple acting in opposition to the current. This pendulum effect substantially reduces the shift tendency. The pendulum effect can be varied at will by flooding or evacuating the bouyancy chambers of the guideway 25.

It is to be understood, of course, that the cable 21 could be replaced by chains, flexible links, telescopic rods or other suitable means.

In the event of pipe failure the system can be reversed, that is to say the trailing tractors 40 now become the prime movers, the sleighs under the individual gantries are reversed, tension is applied to the pipe and the system is moved in the opposite direction to retrieve the laid pipe from the ocean bottom until the damaged part is brought to the surface for repairs.

Although the foregoing has been described with reference to a very long length of pipe, the system could work equally well with pipe that is fabricated at the site immediately in front of the train.

What I claim as my invention:

1. A system for the underwater laying of pipe from an ice surface through a channel cut in the ice, comprising an underwater pipe laying guideway; an above-ice supporting means; ice contacting undercarriage means for mounting said supporting means operatively on the ice surface; said supporting means including means to adjustably support the guideway through said channel at a series of points and increasing depths beneath the ice surface, to cause said guideway to conform to a predetermined shape capable of supporting the pipe and including means to pick up the pipe and feed it into the guideway; means to monitor the configuration of the guideway; and means for moving the system along the ice.

2. A system as claimed in claim 1 in which the guideway is pendulously supported by the support means.

3. A system as claimed in claim 1 in which the pipe to be laid is prefabricated in long lengths.

4. A system as claimed in claim 3 in which the prefabricated long lengths are located adjacent the channel path, supported in a series of rollers mounted on the ice, which rollers form part of the means to feed the pipe into the guideway.

5. A system as claimed in claim 1 in which the guideway is provided with means to vary the bouyancy thereof.

6. A system as claimed in claim 2 in which the guideway is provided with means to vary the bouyancy thereof.

7. A system as claimed in claim 3 in which the guideway is provided with means to vary the bouyancy thereof.

8. A system as claimed in claim 1, in which the pipe laying guideway extends from the ice surface substantially to the bottom of the water.

9. A system as claimed in claim 2, in which the pipe laying guideway extends from the ice surface substantially to the bottom of the water.

10. A system as claimed in claim 3, in which the pipe laying guideway extends from the ice surface substantially to the bottom of the water.

11. A system as claimed in claim 1 in which the above-ice supporting means includes a train of travelling gantries.

12. A system as claimed in claim 11 in which at least the leading gantries of the support means has means to pick up the pipe and assist the feeding thereof into the guideway.

13. A system for the underwater laying of pipe located on an ice surface through a channel cut in the ice, comprising an underwater pipe laying guideway; an above-ice supporting means including a train of travelling gantries, each gantry spanning the ice channel and at least certain of them adjustably cable-supporting a section of the pipe laying guideway through said channel whereby to support the guideway at a series of points and varying depths beneath the ice surface, to cause said guideway to conform to a predetermined shape capable of supporting the pipe; and at least the leading gantries of the supporting means having means to pick up the pipe and assist the feeding thereof into the guideway; means to monitor the configuration of the guideway; and means for moving the system along the ice.

14. A system as claimed in claim 13 in which the pipe laying guideway terminates short of the water bottom.

15. A system as claimed in claim 13 in which the means for moving the train along the ice includes interconnections between the individual gantries comprising, on one side of the channel a series of draw bars and, at the other side, means adapted to adjust the angular position of the gantries relative to each other on the ice surface.

16. A system for the underwater laying of pipe from an ice surface through a channel cut in the ice, comprising an underwater pipe laying guideway; an above-ice supporting means; ice contacting under-carriage means for mounting said supporting means operatively on the ice surface; said supporting means including means to adjustably pendulously support the guideway through said channel at a series of points and increasing depths beneath the ice surface, to cause said guideway to conform to a predetermined shape capable of supporting the pipe and including means to pick up the pipe and feed it into the guideway; means to monitor the configuration of the guideway means; means, located above the ice surface, for applying a tensile force to the pipe line in the direction of pipe laying; and means for moving the system along the ice.

* * * * *